US012468744B2

(12) United States Patent
Murata

(10) Patent No.: US 12,468,744 B2
(45) Date of Patent: Nov. 11, 2025

(54) DOCUMENT PROCESSING METHOD, DOCUMENT PROCESSING SYSTEM, INFORMATION PROCESSING DEVICE, AND GRAPHIC USER INTERFACE

(71) Applicant: LEGALON TECHNOLOGIES, INC., Tokyo (JP)

(72) Inventor: Takahiro Murata, Tokyo (JP)

(73) Assignee: LegalOn Technologies, Inc., Tokyo (JP)

( * ) Notice: Subject to any disclaimer, the term of this patent is extended or adjusted under 35 U.S.C. 154(b) by 0 days.

(21) Appl. No.: 18/359,100

(22) Filed: Jul. 26, 2023

(65) Prior Publication Data

US 2023/0367797 A1 Nov. 16, 2023

Related U.S. Application Data

(63) Continuation of application No. PCT/JP2021/041487, filed on Nov. 11, 2021.

(30) Foreign Application Priority Data

Jan. 27, 2021 (JP) ................... 2021-011366

(51) Int. Cl.
G06F 16/332 (2025.01)
G06F 16/3332 (2025.01)
G06F 16/35 (2019.01)

(52) U.S. Cl.
CPC ...... *G06F 16/3328* (2019.01); *G06F 16/3334* (2019.01); *G06F 16/35* (2019.01)

(58) Field of Classification Search
CPC ... G06F 16/3328; G06F 16/3334; G06F 16/35
See application file for complete search history.

(56) References Cited

U.S. PATENT DOCUMENTS

2006/0020576 A1 1/2006 Karube
2006/0047649 A1 3/2006 Liang
(Continued)

FOREIGN PATENT DOCUMENTS

JP H09-231234 A 9/1997
JP 2004-240887 A 8/2004
(Continued)

OTHER PUBLICATIONS

International Search Report directed to related International Patent Application No. PCT/JP2021/041487, mailed Feb. 1, 2022, with attached English-language translation; 3 pages.

*Primary Examiner* — Tyler J Torgrimson
(74) *Attorney, Agent, or Firm* — Sterne, Kessler, Goldstein & Fox P.L.L.C.

(57) ABSTRACT

A document processing method comprising: outputting information for displaying a search keyword input field for searching for, based on an input search keyword, document information stored in a storage unit, a type display region for selectably displaying (i.e., displaying in a selectable manner) a type decided based on the content of the document information, and a search keyword display region for displaying a search keyword based on a search history of the document information together with a number of search results of the document information searched for by the search keyword.

17 Claims, 9 Drawing Sheets

(56) References Cited

U.S. PATENT DOCUMENTS

| | | | |
|---|---|---|---|
| 2011/0125653 A1* | 5/2011 | Ciccarelli | G06Q 10/1053 707/736 |
| 2014/0229205 A1* | 8/2014 | Gibson | G06Q 40/08 705/4 |
| 2014/0229311 A1* | 8/2014 | Colson | G06Q 30/0206 705/306 |

FOREIGN PATENT DOCUMENTS

| | | |
|---|---|---|
| JP | 2005-122683 A | 5/2005 |
| JP | 2005-128872 A | 5/2005 |
| JP | 2009-301221 A | 12/2009 |
| JP | 2012-018536 A | 1/2012 |
| WO | WO 2004-111876 A | 7/2006 |

* cited by examiner

FIG.3

| DOCUMENT ID | DOCUMENT CONTENT | USER ID | CONTRACT TYPE | ... |
|---|---|---|---|---|
| D001 | OUTSOURCING.doc | U001 | OUTSOURCING CONTRACT | ... |
| D002 | CONFIDENTIAL_COMPANY A.doc | U001 | CONFIDENTIALITY CONTRACT | ... |
| D003 | NONEXCLUSIVE LICENSE.doc | U002 | LICENSE CONTRACT | ... |
| ... | ... | ... | ... | |

| SEARCH KEYWORD ID | SEARCH KEYWORD | NUMBER OF TIMES OF SEARCH |
|---|---|---|
| S001 | CONTRACT INCOMPATIBILITY | 76 |
| S002 | CONFIDENTIALITY | 60 |
| S003 | JURISDICTION OF CONTRACT | 50 |
| ⋮ | ⋮ | ⋮ |

DOCUMENT PROCESSING METHOD, DOCUMENT PROCESSING SYSTEM, INFORMATION PROCESSING DEVICE, AND GRAPHIC USER INTERFACE

CROSS-REFERENCE TO RELATED APPLICATION

The present application is a bypass continuation application based on and claiming the priority of PCT Application No. PCT/JP2021/041487 filed Nov. 11, 2021, the entire contents of which are incorporated herein by reference.

TECHNICAL FIELD

The present disclosure relates to a document processing method, a document processing system, an information processing device, and a graphic user interface.

BACKGROUND ART

An information processing device has been proposed that presents a category of a search result in document search processing to efficiently perform narrowing-down (see, for example, Japanese Patent Application Laid-Open No. 2009-301221).

The information processing device disclosed in Japanese Patent Application Laid-Open No. 2009-301221 performs clustering on a document set extracted as a search result by a search condition input by a user, presents a category name representing the largest cluster including the largest number of classified documents to the user, causes the user to select whether the category is a category in which the user desires to search the search condition, and presents, according to a result of the selection, a document set in the largest cluster or a document set in a cluster other than the largest cluster as a search result.

SUMMARY

An aspect of the invention according to the present disclosure is a document processing method comprising: outputting information for displaying a search keyword input field for searching for, based on an input search keyword, document information stored in a storage unit, a type display region for selectably displaying (i.e., displaying in a selectable manner) a type decided based on the content of the document information, and a search keyword display region for displaying a search keyword based on a search history of the document information together with a number of search results of the document information searched for by the search keyword.

BRIEF DESCRIPTION OF DRAWINGS

FIG. 3 is a schematic diagram illustrating a configuration example of document information.

FIG. 6 is a schematic diagram illustrating a configuration example of search keyword information.

DESCRIPTION

With the information processing device disclosed in Japanese Patent Application Laid-Open No. 2009-301221 described above, although the information processing device narrows down the search results by causing the user to select a category from the document set extracted from the search results by the search condition input by the user, there may be a problem in that it is not possible to dynamically check how the search result changes when the category is selected and how the category changes when the search condition is changed.

An object of the present disclosure is to provide a document processing program, an information processing device, a document processing method, a document processing system, and a graphic user interface that may be more convenient for use.

Embodiment (Configuration of a Document Processing System)

Figure 1:
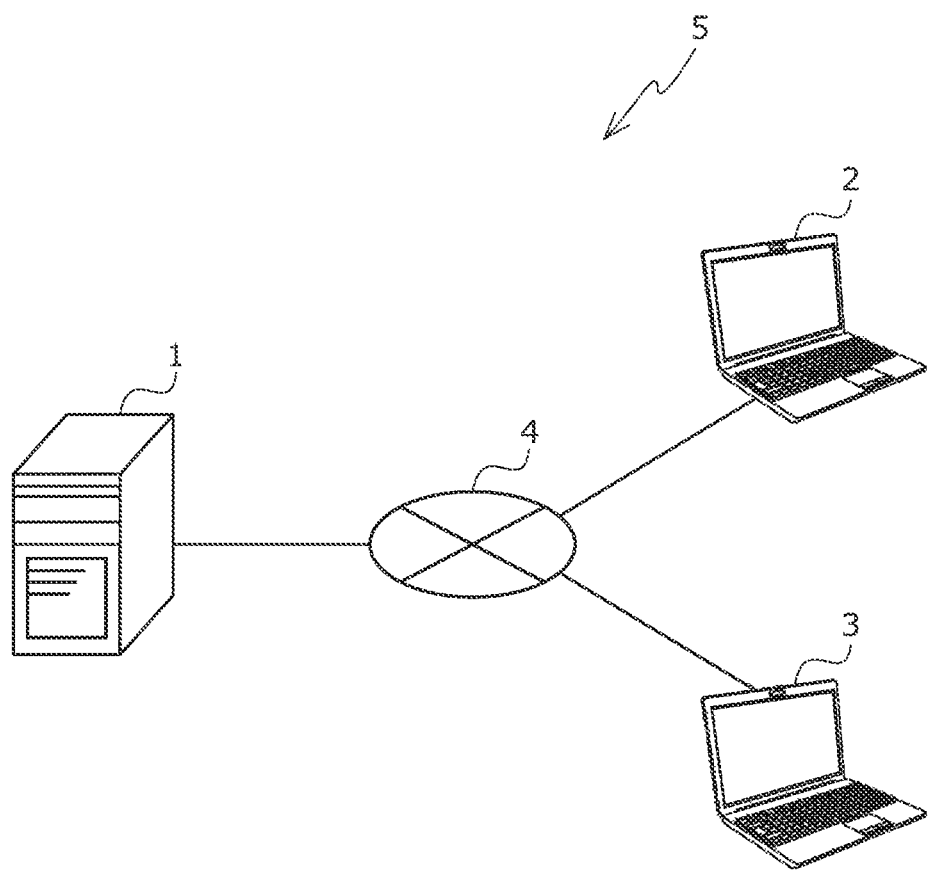
FIG. 1 is a schematic diagram illustrating an example of a configuration of a document processing system according to an embodiment.

FIG. 1 is a schematic diagram illustrating an example of a configuration of a document processing system according to an embodiment.

A document processing system 5 according to an embodiment is configured by connecting a document processing server device 1, a terminal 2, and a terminal 3 to one another via a network 4 in a communicable manner. The terminal 2 is operated by, for example, a user who desires document management, document creation, document content checking, and/or document review, and the terminal 3 is operated by another user. The user of the terminal 2 and the user of the terminal 3 may use the document processing system 5 in order to treat, for example, a contract and/or a reference document that defines a reference when reviewing the contract, as document information, and check the content in the contract and manage document information created by one or both of the users to perform the search and narrow-down the managed document information.

The document processing server device 1 may be a server-type information processing device that operates according to requests from the terminal 2 and the terminal 3. The document processing server device 1 may include in a main body, electronic components, such as a CPU (Central Processing Unit) for processing information, an HDD (Hard Disk Drive), and a flash memory. Note that the document processing server device 1 does not always need to be configured by a stand-alone information processing device. A plurality of information processing devices may operate in tandem as the document processing server device 1. The document processing server device 1 may operate according to any Cloud service. The functions of the document processing server device 1 may occur in the terminal 2 and/or the terminal 3.

The terminal 2 and the terminal 3 are information processing devices, such as a PC (Personal Computer) or a tablet terminal, and include, in a main body, electronic components, such as a CPU for processing information, and a flash memory.

The network 4 is a communication network capable of performing high-speed communication and is a wired or wireless communication network, such as the Internet, an intranet, or a LAN (Local Area Network).

In the configuration explained above, as an example, a document processed by the document processing server device 1 may be a document in a legal field, such as a contract. One or both of the users may be persons who are not legal specialists but need to create a contract and/or reference a document that defines a reference when reviewing the contract or may be persons who are legal specialists, such as lawyers, and have knowledge of the creation of contracts and/or reference documents. For example, one or both of the users may be employees in a sales department or persons in an in-house legal department at a company. Note that, in the following explanation, the description of "contract" includes the meaning of contract and/or reference document.

As an example of a basic operation, after the terminal 2 or the terminal 3 uploads document information to the document processing server device 1, the document processing server device 1 may manage the document information. The terminal 2 or the terminal 3 may access the document processing server device 1 to, for example, check the content of the document information. When a lot of document information is managed, in order to reduce the workload required for searching and narrowing-down of users, the document processing server device 1 may classify document information 111 into a contract type, display a list of contract types included in a search target of the document information and a list of search keywords higher in order in a search history, display the number of hits for a search keyword, recalculate the number of hits based on the selected contract type, and dynamically output a change in the search result due to a change in a search target type or the search keyword. When displaying the search result by the search keyword, the document processing server device 1 may selectably display (i.e., display in a selectable manner) the contract type included in the document information of the search result, and dynamically output a change in the contract type included in the search result. A specific example of a display method is explained below. In the following explanation, a clause is sometimes referred to as an "article". The embodiment is explained below.

One terminal 2 and one terminal 3 are illustrated. However, a plurality of terminals 2 and a plurality of terminals 3 may be connected to the network 4. Similarly, a plurality of users may operate the terminals 2 and the terminals 3.

(Configuration of the Document Processing Server Device)

Figure 2:
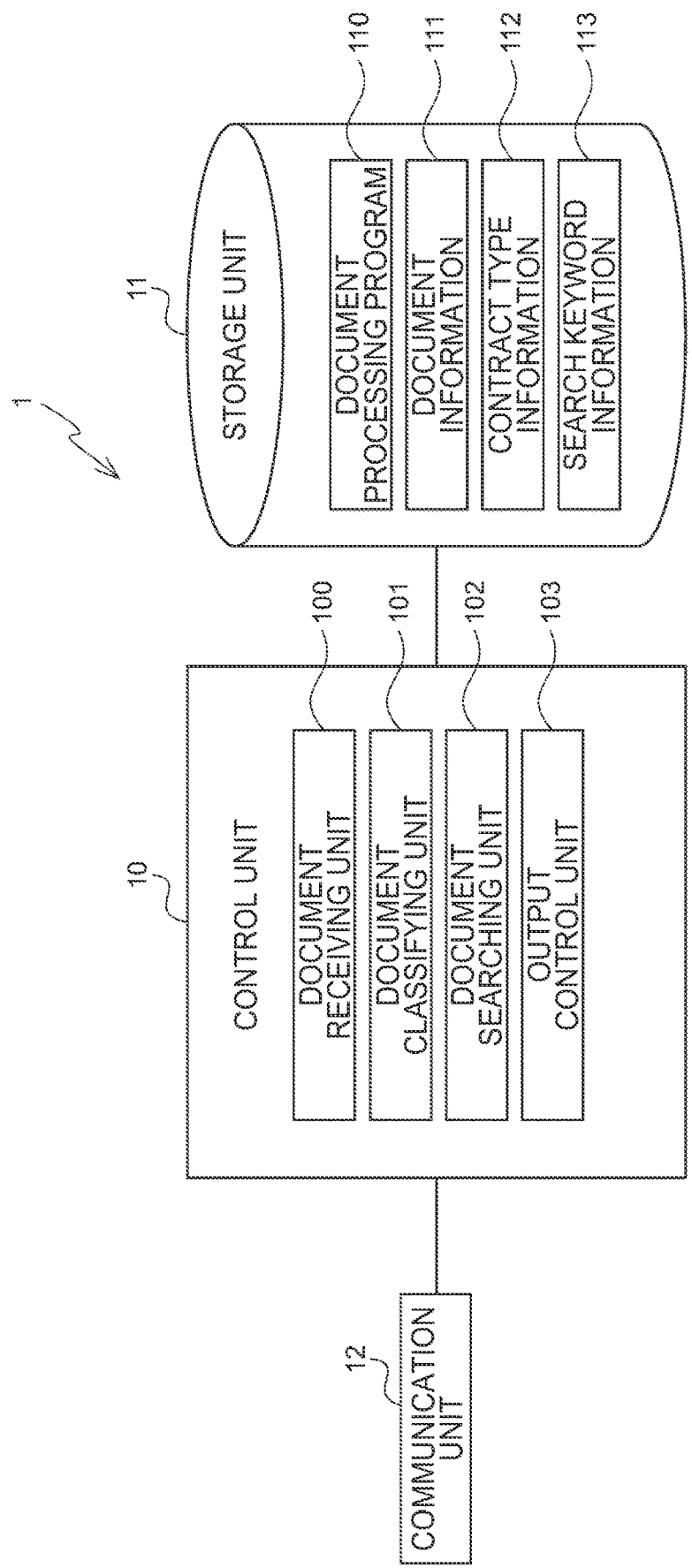
FIG. 2 is a block diagram illustrating a configuration example of a document processing server device according to the embodiment.

FIG. 2 is a block diagram illustrating a configuration example of the document processing server device 1 according to the embodiment.

The document processing server device 1 may be configured from a CPU or the like and control units. The document processing server device 1 may include a control unit 10 that executes various programs, a storage unit 11 that is configured from a storage medium, such as a flash memory that stores information, and a communication unit 12 that functions as a communication interface for communicating with outside devices via the network 4.

The control unit 10 may be configured from a processor, such as a CPU, that is electrically connected to the storage unit 11, which is configured from a memory, and the communication unit 12 functions as the communication interface. The control unit 10 executes the document processing program 110, explained below, to function as a document receiving unit 100, a document classifying unit 101, a document searching unit 102, an output control unit 103, and the like.

The document receiving unit 100 receives, for example, a contract as the document information 111 from the terminal 2 or the terminal 3 and stores the contract in the storage unit 11. The document information 111 may be image information, such as a PDF in which a sentence is laid out, or may be information such as a text file including text data or a word file. Note that, when the document information 111 is information other than text, the document receiving unit 100 performs OCR (Optical Character Recognition) or the like to convert the information into text.

The document classifying unit 101 may analyze constituent elements of the contract such as a title, a preface, and an article unit of the document information 111 to classify the document information 111 into a predetermined category and stores the document information 111 in the storage unit 11 as contract type information 112. A specific classification method is explained below.

The document searching unit 102 may search for the document information 111 using, as a search condition, at least one of a contract type, a search keyword, and a search keyword higher in order in the search history. The document searching unit 102 may calculate the number of hits in the document information 111 in case the search keyword higher in order in the search history is used as the search condition. When one or both of the contract type and the search keyword are used as the search condition, the document searching unit 102 may calculate the number of hits in case the contract type and the search keyword higher in order in the search history are used as the search conditions.

The output control unit 103 may control the output of information, with a predetermined method, to display on display units of the terminal 2 and the terminal 3, the document information 111, the contract type information 112, and the search keyword information 113 stored in the storage unit 11 and output results of the units 100 to 103. Details of the display method are explained below.

The storage unit 11 may be configured from a memory, such as a flash memory, and is electrically connected to the control unit 10, configured from the processor or the like, and the communication unit 12, functioning as the communication interface. The storage unit 11 may store the document processing program 110 for causing the control unit 10 to operate as the units 100 to 103 explained above, the document information 111, the contract type information 112, the search keyword information 113, and the like.

FIG. 3 is a schematic diagram illustrating a configuration example of the document information 111.

The document information 111 may include a document ID for identifying a document in the document information 111, document content indicating a file that is the content of the document, a user ID for identifying a user who uploaded the document, a contract type of the document, and other information.

The document information 111 may include attribute information of the document. The attribute information may include information such as a library indicating that it is a document created or reviewed by any user in the past, a model created by any user and usable as a template in creating other document, and a reference document to be referred to or referred to when reviewing a document. Any individual attribute information is associated with each document in the document information 111.

Figure 4:
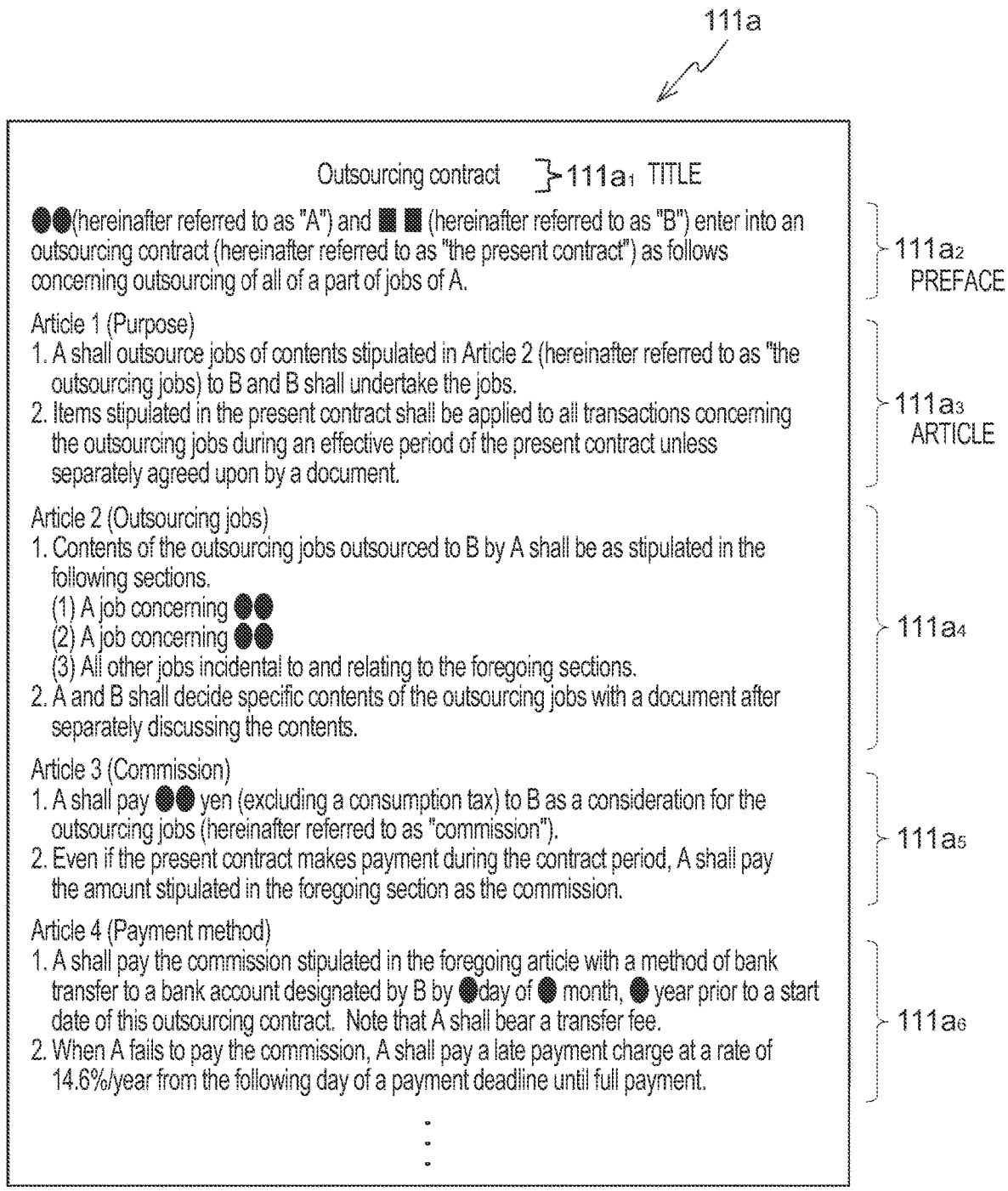
FIG. 4 is a schematic diagram illustrating a configuration example of specific content of the document information.

FIG. 4 is a schematic diagram illustrating a configuration example of the specific content of the document information 111.

Document information 111a may indicate the content of the specific text of the document information 111 and includes a title $111a_1$, a preface $111a_2$, an article $111a_4$, an article $111a_5$, an article $111a_6$, and the like.

Figure 5:
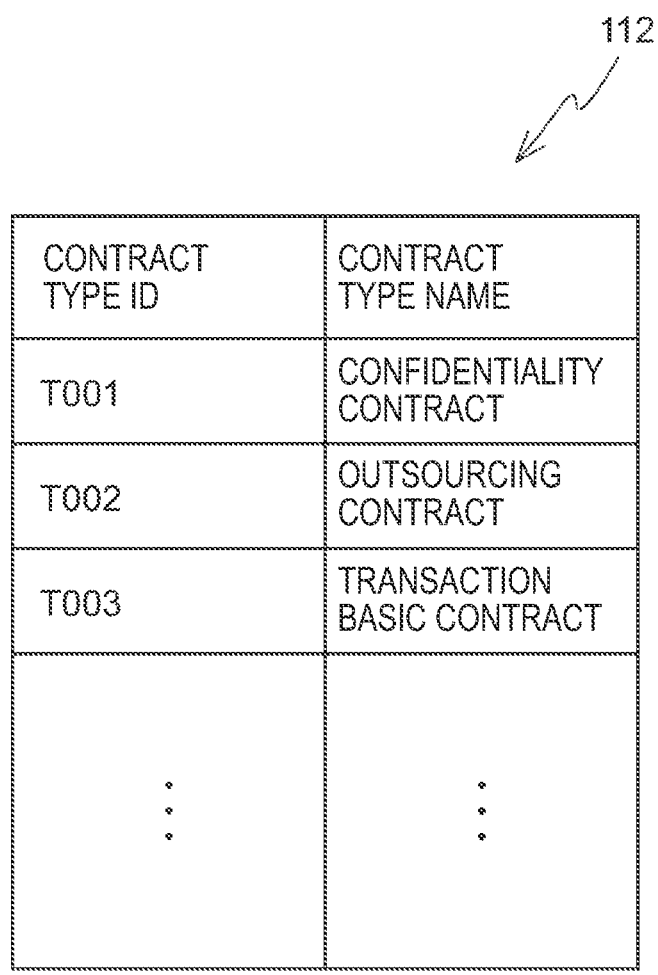
FIG. 5 is a schematic diagram illustrating a configuration example of contract type information.

FIG. 5 is a schematic diagram illustrating a configuration example of the contract type information 112.

The contract type information 112 may include a contract type ID for identifying a contract type and a contract type name that is the name of the contract type.

FIG. 6 is a schematic diagram illustrating a configuration example of the search keyword information 113.

The search keyword information 113 may include a search keyword ID for identifying a search keyword, a search keyword indicating the content of the search keyword, and a number of times of search indicating the number of times a search is performed.

(Operation of the Document Processing System)

Subsequently, actions in the embodiment may be divided into (1) a basic operation, (2) a number of search results display operation, and (3) a type display narrowing-down operation and explanation. The operations may be explained below with the terminal 2 set as an operation target. However, when the operations are the same, even when the operation target is replaced with the terminal 3, the explanation of the operation is omitted.

(1) Basic Operation

First, a user may operate the terminal 2 in order to log into a service provided by the document processing server device 1. When receiving input information, such as a user ID and a password from the user, the terminal 2 may transmit an authentication request to the document processing server device 1 together with the information.

When receiving the authentication request together with the information such as the user ID and the password from the terminal 2, the document processing server device 1 may refer to user information, including a user ID and a password registered in advance, and perform authentication of the user.

Subsequently, when the login to the service is completed, the user may operate the terminal 2 in order to upload the document information of a contract and change document information in the document processing server device 1. The terminal 2 may upload the document information to the document processing server device 1.

(2) Number of Search Results Display Operation

Figure 9:
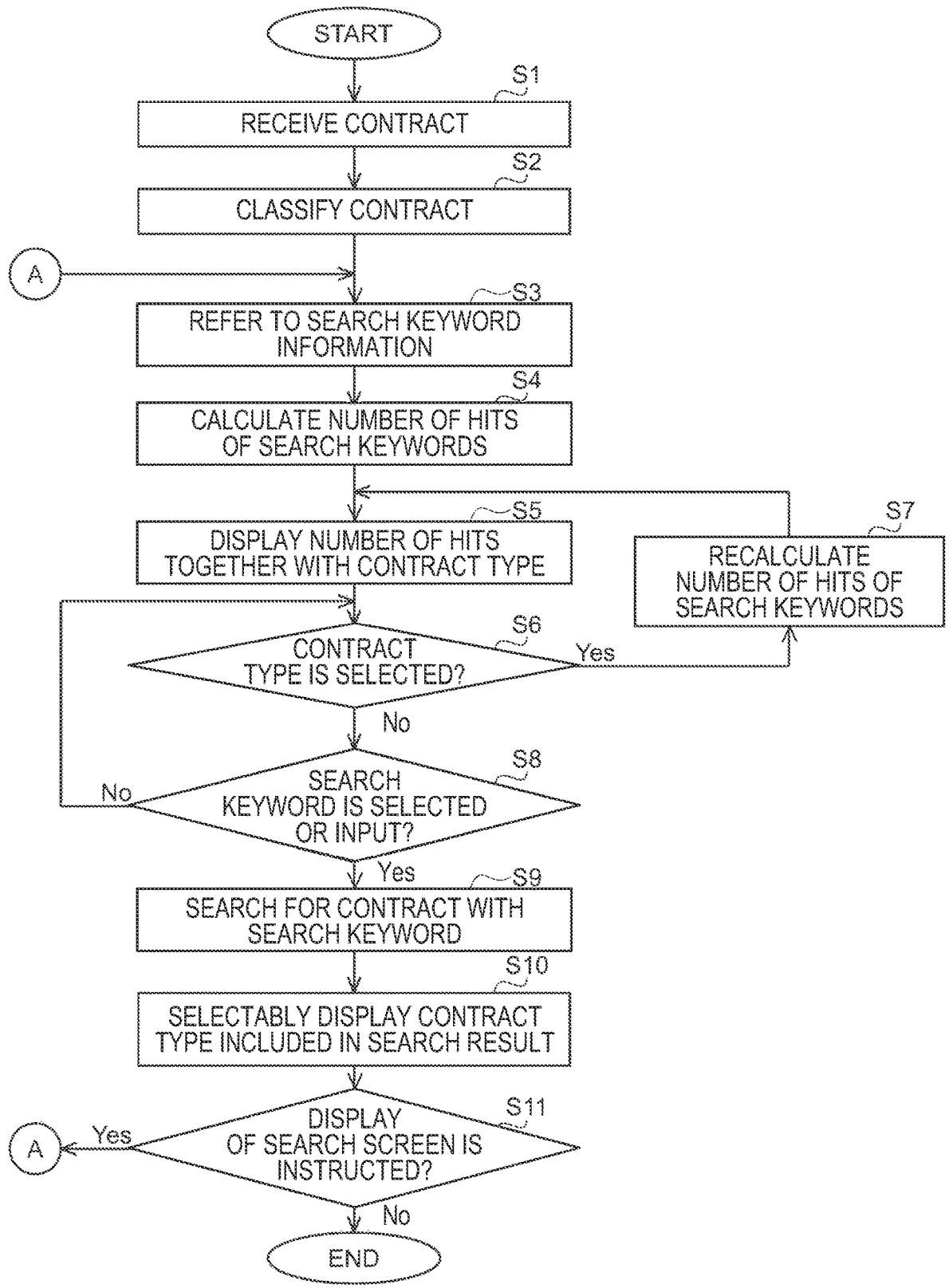
FIG. 9 is a flowchart illustrating an operation example of a document processing server device.

FIG. 9 is a flowchart illustrating an operation example of the document processing server device 1.

The document receiving unit 100 of the document processing server device 1 may receive the document information 111 corresponding to the contract from the terminal 2 operated by the user and store the document information 111 in the storage unit 11 (S1).

Subsequently, the document classifying unit 101 of the document processing server device 1 may analyze constituent elements of the contract such as a title, a preface, and an article unit in the document information 111 to classify the document information 111 into a predetermined category and store the document information 111 in the storage unit 11 as the contract type information 112 (S2).

Here, the document classifying unit 101 may perform classification based on a learning result of machine learning performed in advance. As an example, when using machine learning, contract data attached with a label of a contract type in advance may be prepared as teacher data and a classifier may be generated by causing the document classifying unit 101 to learn, together with a use frequency, terms used in a title of a contract and a text in the same contract type. When receiving the contract as input, the classifier as a learning result may output estimation probabilities for contract types of a contract type list prepared in advance, and classifies, based on the estimation probabilities, which type the contract is. The above learning method and the specification of classifiers serve as examples but other methods or specifications may be used.

Since a contract type may often be directly described in the title of the contract, the document classifying unit 101 may perform weighting to prioritize determination from the contract title as the output of the classifier.

In this case, first, when the contract title is the same as the name of the contract type of the contract type list prepared in advance, the document classifying unit 101 may set the type as the contract type. Subsequently, the document classifying unit 101 may perform classification of contract type systems (rough contract types include: "outsourcing contract", "license contract", and the like) from the contract title and the contract text, performs scoring, and adopts a contract type having a high score. Further, the document classifying unit 101 may perform scoring of finer classifications from the contract title and the contract text and sets a contract type having a high score as the contract type (for example, contracts classified as "outsourcing contracts" are further finely classified into "distribution outsourcing contracts", "software development outsourcing contracts", and the like from the contract title and the content of the text). The scoring may calculate an estimation probability of the type classification from the appearance of words in the contract title and the number of times words appear in the contract text and uses the estimation probability as a score.

In a situation in which the contract type information 112 is generated in advance as explained above, the user may operate the terminal 2 in order to search for a desired document.

The terminal 2 may request the document processing server device 1 to display a search screen.

Figure 7:
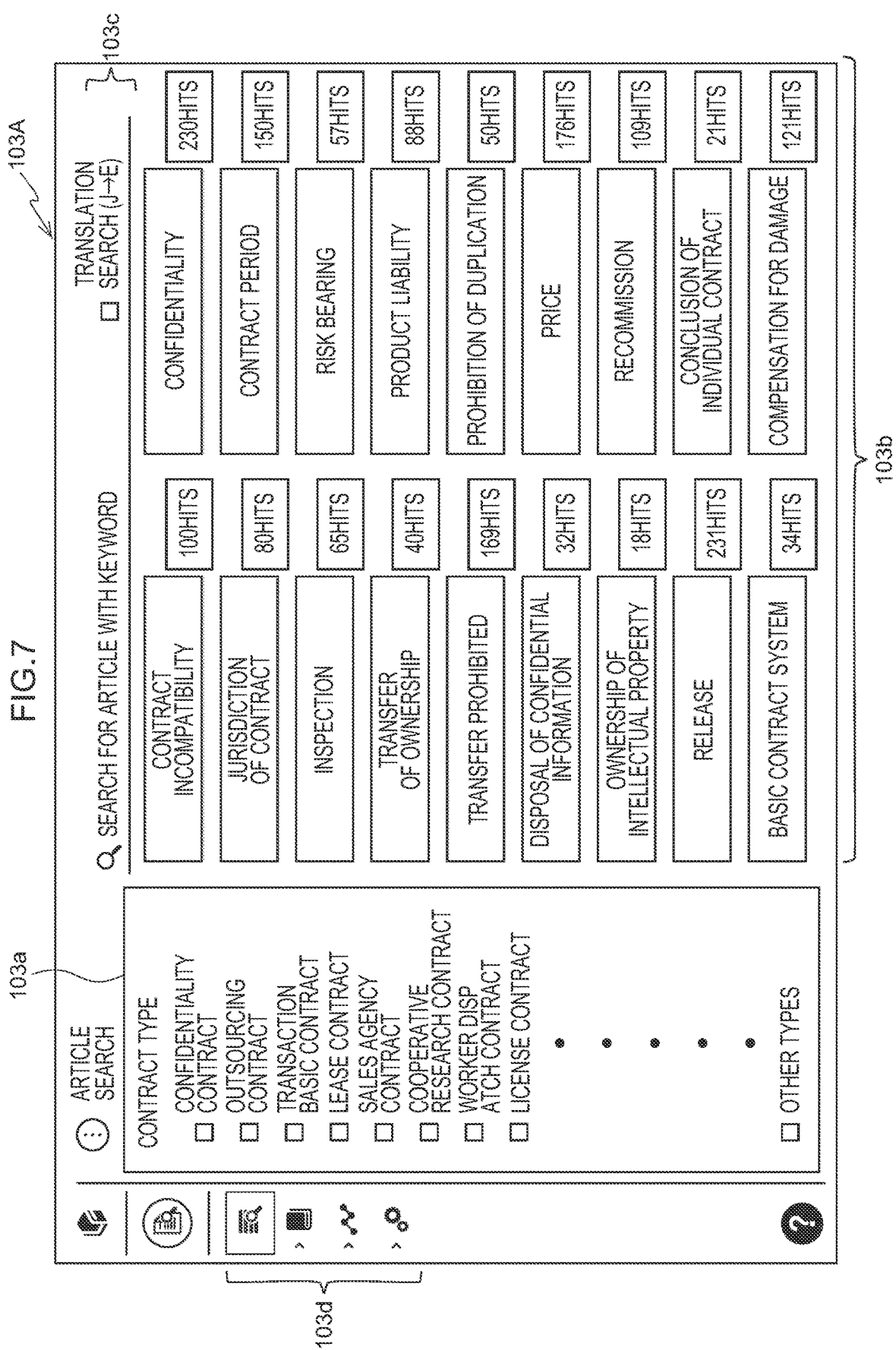
FIG. 7 is a schematic diagram illustrating an example of a configuration of a search screen.

The output control unit 103 of the document processing server device 1 may output information for displaying a search screen illustrated in FIG. 7 on the display unit of the terminal 2. The document searching unit 102 may refer to the search keyword information 113 that is the search history (S3) and calculates the number of hits in the document information 111 when a search keyword higher in order in the search history is used as a search condition (S4). The output control unit 103 displays the contract type together with the number of hits (S5).

FIG. 7 is a schematic diagram illustrating an example of a configuration of the search screen.

A screen 103A includes a contract type display region 103a where contract types are displayed together with checkboxes based on the contract type information 112, a search keyword display region 103b where a search keyword higher in order in the search history is displayed together with the number of hits based on the search keyword information 113, a search keyword input field 103c for inputting a keyword for searching for the document information 111, and another function icon 103d for transitioning to another screen.

Note that, in the example illustrated in FIG. 7, since the checkboxes of all the contract types are not checked in the contract type display region 103a, the number of hits displayed in the search keyword display region 103b is the number of hits when a contract type is not limited.

When a checkbox of a contract type is checked by the user (S6; Yes), the document searching unit 102 recalculates, based on the document information 111 of the checked contract type, the number of hits for the search keyword (S7). The output control unit 103 displays the contract type together with the number of hits (S5).

Note that the display order of the search keywords displayed in the search keyword display region 103*b* is, as an example, a number of times an article appears in the search history order. The search keywords may be displayed in any arrangement, such as number of hits order or character arrangement order. Display order of the contract types in the contract type display region 103*a* is, as an example, a number of hits order. The contract types may be displayed in any arrangement, such as based on a number of times checked or a character arrangement.

As illustrated in FIG. 7, the number of hits calculated irrespective of attribute information of the document information is displayed. Additionally, the number of hits may be divided into pieces of attribute information and displayed.

Subsequently, the user operates the terminal 2 and, while referring to the screen 103A, selects a search keyword displayed in the search keyword display region 103*b* or inputs a search keyword to the search keyword input field 103*c* and searches for the document information 111 (S8; Yes).

The document searching unit 102 searches for the document information 111 according to the operation content of the user using, as a search condition designated by the user among the selected contract type, the search keyword selected from the search keyword display region 103*b*, and the search keyword input to the search keyword input field 103*c* (S9). The output control unit 103 outputs information for displaying a search result on the display unit of the terminal 2 (S10). A situation in which "contract incompatibility" is selected from the search keyword display region 103*b* as the search keyword or a situation in which "contract incompatibility" is input to the search keyword input field 103*c* is explained below.

(3) Type Display Narrowing-Down Operations

The document searching unit 102 of the document processing server device 1 searches for the document information 111 using a search keyword "search keyword" as a search condition. The output control unit 103 outputs information for displaying a search result on the display unit of the terminal 2.

Figure 8:
FIG. 8 is a schematic diagram illustrating an example of a configuration of a screen showing a search result.

FIG. 8 is a schematic diagram illustrating an example of a configuration of a screen showing a search result.

Like the screen 103A, a screen 103B includes the contract type display region 103*a*, the search keyword input field 103*c*, and the other function icon 103*d* and includes a search result display region 103*e* where a result obtained by searching for the document information 111 using a search keyword "contract incompatibility" as a search condition is displayed.

In the search result display region 103*e*, a file name and the creator of the document information 111 hit by the search, a tag given to the document information 111, and the like, are displayed in a lower part and a range including the search keyword "contract incompatibility" in the hit document information 111 is displayed.

In the contract type display region 103*a*, only a contract type included in the document information 111 hit by the search keyword "contract incompatibility" is selectably displayed (i.e., displayed in a selectable manner) by the output control unit 103. A contract type not included in the hit document information 111 is unselectably displayed (i.e., displayed in a non-selectable manner or in a display form different from a display form of the selectable contract type) by the output control unit 103. Note that the contract type not included in the hit document information 111 may be hidden.

Note that, when the contract type is selected on the screen 103B, the search result is narrowed down and displayed in the search result display region 103*e*.

Subsequently, when receiving an instruction to display the screen 103A for searching on the screen 103B (S11), the output control unit 103 returns to step S3 and displays the screen 103A.

Effects in the Embodiment

According to the embodiment explained above, the document information 111 is classified into a contract type, a list of contract types included in the document information 111 set as a search target (the contract type display region 103*a*) and a list of search keyword higher in order in the search history (the search keyword display region 103*b*) are displayed, the number of hits for a search keyword is displayed, and the number of hits is recalculated based on a contract type selected in the search keyword display region 103*b*. Therefore, it is possible to dynamically output a change in a search result due to a change in the type of search target or search keyword.

When a search result using the search keyword is displayed in the search result display region 103*e*, a contract type included in the document information 111 of the search result is selectably displayed (i.e., displayed in a selectable manner) in the contract type display region 103*a*. Therefore, it is possible to dynamically output a change in the contract type included in the search result.

Other Embodiments

Note that the present invention is not limited to the embodiment explained above and various modifications are possible without departing from the spirit of the present invention.

For example, the document information 111 is not limited to the contract and may be a legal document itself or a document in a field other than the legal field, such as a user's manual. The present invention is applicable to such a document in the same manner. A language of the document information 111 is not limited to Japanese and English. The present invention is also applicable to other languages if the languages can configure a sentence from which information can be extracted.

In the embodiment explained above, a situation is presented in which the document processing server device 1 functions as the information processing device. Additionally the processing executed by the document processing server device 1 and the information stored in the document processing server device 1 may be dispersed to other server devices, and the other server devices may be integrated to function as the information processing device. The terminal 2 or the terminal 3 may function as the information processing device and execute the respective pieces of processing.

In the embodiment explained above, a situation is presented in which a search result is output to the terminal 2 and the terminal 3 mainly via the communication unit of the document processing server device 1, and the search result is displayed on the display unit of the terminal 2 or 3. However, a user may to be notified of such a search result by any method. When the terminal 2 or the terminal 3 functions as the document processing device, the terminal 2 or the terminal 3 may output the search result to an externally attached display or may directly output the search result to the display unit included in the terminal 2 or the terminal 3.

In the embodiment explained above, the functions of the units 100 to 103 of the control unit 10 are realized by the program. However, all or some of the units may be realized by hardware such as an ASIC. The program used in the embodiment explained above can also be stored and distributed in a recording medium, such as a CD-ROM. Changes, deletions, additions, and the like of the steps presented in the embodiment explained above are possible without departing from the spirit of the present invention.

[Notes]

The disclosed embodiment further discloses the following notes.

(Note 1)

A document processing program for causing a computer to function as output control means for outputting information for displaying a search keyword input field for searching for, based on an input search keyword, document information stored in a storage unit, a type display region for selectably displaying (i.e., displaying in a selectable manner) a type decided based on content of the document information, and a search keyword display region for displaying a search keyword based on a search history of the document information in past together with a number of search results of the document information searched for by the search keyword.

(Note 2)

The document processing program according to note 1, wherein when selection of a type of the type display region is received in the output control means, a number of search results recalculated based on the selected type is displayed in the search keyword display region.

(Note 3)

The document processing program according to note 1 or 2, wherein when the input of a search keyword to the keyword input field is received in the output control means or selection of a search keyword is received from the search keyword display region and corresponding document information is searched for from the document information by the search keyword, among types displayed in the type display region, a type not included in the document information of a search result is unselectably displayed or is not displayed.

(Note 4)

The document processing program according to any one of notes 1 to 3, wherein the computer is connected to one or more terminals via a network in a communicable manner.

(Note 5)

The document processing program according to any one of notes 1 to 3, wherein the computer is connected to one or more terminals via a wireless communication network.

(Note 6)

The document processing program according to any one of notes 1 to 5, wherein the document information further includes one or more pieces of attribute information, and as the number of search results of the search keyword display, a number of search results searched for by the one or more pieces of attribute information is displayed together with the attribute information.

(Note 7)

The document processing program according to any one of notes 1 to 6, wherein the document information includes a contract and/or a reference document that defines a reference in reviewing the contract.

(Note 8)

An information processing device comprising:

a memory configured to store document information in addition to a predetermined instruction command; and a processor configured to execute processing for outputting, based on the instruction command stored in the memory, information for displaying a search keyword input field for searching for, based on an input search keyword, document information stored in a storage unit, a type display region for selectably displaying (i.e., displaying in a selectable manner) a type decided based on content of the document information, and a search keyword display region for displaying a search keyword based on a search history of the document information in past together with a number of search results of the document information searched for by the search keyword.

(Note 9)

A document processing method comprising an output control step for outputting information for displaying a search keyword input field for searching for, based on an input search keyword, document information stored in a storage unit, a type display region for selectably displaying (i.e., displaying in a selectable manner) a type decided based on content of the document information, and a search keyword display region for displaying a search keyword based on a search history of the document information in past together with a number of search results of the document information searched for by the search keyword.

What is claimed is:

1. A computer implemented method for document processing, wherein the method comprises:

one or more processors configured to:

recognize, from a constituent element of an input document, information associated with the input document based on a machine learning model, wherein the information comprises one or more of a document keyword, a document type, and a document information, and wherein the document type is a classification determined from the constituent element of the input document and the machine learning model;

storing the input document, the recognized document type, and the document information associated with the input document in a storage unit;

displaying, on a first display area of a computer screen, a search keyword input field for searching document information stored in the storage unit;

displaying on a second display area of the computer screen a document type selection region for displaying a plurality of document types available for selection, wherein document types are classified based on content of the document information;

displaying on a third display area of the computer screen a search keyword display region for displaying a keyword search history and an associated number of search results obtained during a prior keyword search of the document information;

receiving, from a user, a type selection input in the second display area of the computer screen; and in response to receiving the type selection input from the user, updating the computer screen, by the one or more processors, to display search results included in the selected type as selectable and to hide or display as not selectable search results not included in the selected type.

2. The computer implemented method for document processing according to claim 1,
wherein the type selection input is selected from the displayed document types.

3. The computer implemented method for document processing according to claim 1, further comprising:
receiving, from a user, in the first display area of the computer screen, a keyword search input;
displaying, in the third display area of the computer screen, stored documents containing the keyword; and
updating the document type selection region displayed on the second display area of the computer screen to display for selection the document types corresponding to documents containing the keyword.

4. The computer implemented method for document processing according to claim 3, wherein
the document information further includes one or more pieces of attribute information, and
the one or more pieces of attribute information are displayed in the third display area of the computer screen with the stored documents containing the keyword.

5. The computer implemented method for document processing according to claim 1, wherein the document type is a legal document.

6. The computer implemented method for document processing according to claim 5, wherein the document type is a contract type.

7. The computer implemented method for document processing according to claim 6, wherein the document information includes a contract reference document.

8. The computer implemented method for document processing according to claim 6, wherein the document information includes contract attribute information.

9. A document processing device comprising:
one or more memories configured to store document information in addition to a predetermined instruction command; and
one or more processors configured to:
recognize, from a constituent element of an input document, information associated with the input document based on a machine learning model, wherein the information comprises one or more of a document keyword, a document type, and a document information, and wherein the document type is a classification determined from the constituent element of the input document and the machine learning model;
storing the input document, the recognized document type, and the document information associated with the input document in a storage unit;
displaying, on a first display area of a computer screen, a search keyword input field for searching document information stored in the storage unit;
displaying on a second display area of the computer screen a document type display region for displaying a plurality of document types available for selection, wherein the document types are classified based on content of the document information;
displaying on a third display area of the computer screen a search keyword display region for displaying a keyword search history and an associated number of search results obtained during a prior keyword search of the document information;
receiving, from a user, a type selection input in the second display area of the computer screen; and
in response to receiving the type selection input from the user, updating the computer screen, by the one or more processors, to display search results included in the selected type as selectable and to hide or display as not selectable search results not included in the selected type.

10. The document processing device according to claim 9, wherein the type selection input is selected from the displayed document types.

11. The document processing device according to claim 9, wherein the processor is further configured to:
receiving, from a user, in the first display area of the computer screen, a keyword search input;
displaying in the third display area of the computer screen stored documents containing the keyword; and
updating the document type selection region displayed on the second display area of the computer screen to display for selection the document types corresponding to documents containing the keyword.

12. The document processing device according to claim 11, wherein
the document information further includes one or more pieces of attribute information, and
the one or more pieces of attribute information are displayed in the third display area of the computer screen with the stored documents containing the keyword.

13. The document processing device according to claim 9, further comprising connecting the one or more processors to one or more terminals via a network in a communicable manner.

14. The document processing device according to claim 9, wherein the document information includes a contract.

15. The document processing device according to claim 14, wherein the document information includes a contract reference document.

16. The document processing device according to claim 14, wherein the document information includes contract attribute information.

17. The document processing device system according to claim 9, wherein the one or more processors comprise:
a first processor configured to recognize, from the constituent element of the input document, the information associated with the document based on the machine learning model, wherein the information comprises one or more of the document keyword, the document type, and the document information, and wherein the document type is a classification determined from the constituent element of the input document and the machine learning model, and
a second processor configured to store one or more of the input document, the recognized document type, and the document information associated with the input document in the storage unit.

\* \* \* \* \*